United States Patent
Tanaka

(10) Patent No.: US 10,967,722 B2
(45) Date of Patent: Apr. 6, 2021

(54) VEHICLE LOWER STRUCTURE

(71) Applicant: TOYOTA JIDOSHA KABUSHIKI KAISHA, Aichi-ken (JP)

(72) Inventor: Shinobu Tanaka, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/736,816

(22) Filed: Jan. 8, 2020

(65) Prior Publication Data
US 2020/0215895 A1 Jul. 9, 2020

(30) Foreign Application Priority Data
Jan. 9, 2019 (JP) .............................. JP2019-001664

(51) Int. Cl.
*B60K 1/04* (2019.01)
*B60L 50/60* (2019.01)
*B62D 25/20* (2006.01)
*B62D 21/15* (2006.01)

(52) U.S. Cl.
CPC ................ *B60K 1/04* (2013.01); *B60L 50/66* (2019.02); *B62D 25/20* (2013.01); *B60K 2001/0438* (2013.01); *B62D 21/157* (2013.01)

(58) Field of Classification Search
CPC ............. B60K 2001/0438; B60K 1/04; H01M 2/1077; Y02T 10/70; B60L 50/66; B62D 25/20
See application file for complete search history.

(56) References Cited

U.S. PATENT DOCUMENTS

| | | | | |
|---|---|---|---|---|
| 10,476,060 | B1* | 11/2019 | Smith | H01M 2/1083 |
| 2012/0326107 | A1* | 12/2012 | Ojima | B60K 1/04 |
| | | | | 254/89 R |
| 2015/0151624 | A1* | 6/2015 | Yamada | B60K 1/04 |
| | | | | 180/68.5 |
| 2018/0029493 | A1* | 2/2018 | Kobayashi | B60L 50/66 |
| 2020/0227706 | A1* | 7/2020 | Kuno | B60K 1/04 |
| 2020/0262284 | A1* | 8/2020 | Shirooka | B60L 3/0007 |

FOREIGN PATENT DOCUMENTS

| JP | 2010-153130 A | 7/2010 |
|---|---|---|
| JP | 2018-16243 A | 2/2018 |

* cited by examiner

*Primary Examiner* — John D Walters
*Assistant Examiner* — James J Triggs
(74) *Attorney, Agent, or Firm* — Hauptman Ham, LLP

(57) ABSTRACT

A battery pack comprises a lower-stage battery stack and an upper-stage battery stack. The upper-stage battery stack is separated from the lower-stage battery stack in a vehicle height direction. A middle frame that is a reinforcing member is arranged at a height position that matches a height position of a separation space between the upper-stage battery stack and the lower-stage battery stack in terms of a position in the vehicle height direction. Longitudinal frames of the middle frame project outward from the upper-stage battery stack in a vehicle width direction.

4 Claims, 12 Drawing Sheets

VEHICLE LOWER STRUCTURE

CROSS REFERENCE TO RELATED APPLICATION

This application claims priority to Japanese Patent Application No. 2019-001664, filed on Jan. 9, 2019, which is incorporated herein by reference in its entirety.

TECHNICAL FIELD

The present disclosure relates to a vehicle lower structure in which a battery is stored under a floor of a vehicle.

BACKGROUND

In a vehicle, such as an electric car, in which a rotating electric machine is used as a driving source, a battery is mounted as a power source for the vehicle. For example, in the publication of JP 2010-153130 A, a battery pack is stored under a floor panel that constitutes a floor surface of a vehicle chamber.

The battery pack, which is a heavy weight, is fixed to a framework member of the vehicle. For example, a lower frame that is the framework member is provided on a bottom surface of the battery pack, and the lower frame projects outward from the battery pack in a vehicle width direction. Meanwhile, a pair of side members that are the framework members are provided on both sides of the floor panel in the vehicle width direction and extend in a vehicle front-rear direction. Portions of the lower frame that project from the battery pack are fastened to the side members with nuts and bolts or the like.

A plurality of battery stacks are stored in the battery pack. In this storage, arrangement of the battery stacks is determined to follow a floor shape of the vehicle. For example, a floor surface of a luggage space behind the vehicle chamber is raised above a floor surface of a passenger space. In a rear portion of the battery pack disposed along this floor surface shape under a floor, the battery stacks are stacked in two stages, upper and lower.

To acquire a space of a cooling air flow path and a conduction wire (a cable) in the lower-stage battery stack, the upper-stage battery stack is separated from the lower-stage battery stack in a vehicle height direction. For example, a bracket that is a support member extends from a bottom surface of a case tray that stores the battery stack in a vehicle height direction, and the upper-stage battery stack is supported (raised and supported) by the bracket.

Additionally, when the lower frame of the bottom surface of the battery pack is fastened to the pair of side members, the battery pack is disposed between the pair of side members. At this time, a position of at least a part of the battery pack matches a position of each side member in a vehicle height direction.

When collision of a side surface of the vehicle (hereinafter appropriately referred to as side collision) occurs in such an arrangement as described above, the battery pack that is the heavy weight is energized in the vehicle width direction due to inertia (laterally shaken). At this time, there is concern that the upper-stage battery stack comes in contact with the side member that is present on a side of the battery stack.

That is, the lower-stage battery stack is fixed to a lower arm, and the lower arm is fixed to the side member. Therefore, there is structurally low possibility that the lower-stage battery stack comes in contact with the side member.

On the other hand, the upper-stage battery stack is fixed to the lower arm via a support member such as the bracket in a state where the battery stack is separated (floated) from the lower-stage battery stack. When the upper-stage battery stack is energized in the vehicle width direction during the side collision, the bracket undergoes buckling deformation, depending on a strength of the bracket. Consequently, there is concern that the upper-stage battery stack moves in the vehicle width direction to be in contact with the side member as it is.

It is considered that to inhibit the buckling deformation of the bracket, the strength of the bracket (the support member) is increased, for example, by use of a steel plate having a large thickness. However, for example, there is concern that change in thickness also causes increase in weight of the upper-stage battery pack, and a complicated operation of calculating the strength again to change the thickness is required to cope with such change in design.

To solve the problem, it is an advantage of the present disclosure to provide a vehicle lower structure in which it is possible to inhibit transmission of a collision load to an upper-stage battery stack during side collision irrespective of a strength of a support member of the upper-stage battery stack.

SUMMARY

The present disclosure relates to a vehicle lower structure. The structure comprises a battery pack, a lower frame, and a pair of side frames. The battery pack is stored under a floor panel. The lower frame is a framework member provided on a bottom surface of the battery pack, and having fastening portions formed at both ends that project outward from the battery pack in a vehicle width direction. A pair of side members are framework members that are provided on both sides of the floor panel in the vehicle width direction and extend in a vehicle front-rear direction, and to which the fastening portions of the lower frame are fastened. The battery pack comprises a lower-stage battery stack fixed to the lower frame, and an upper-stage battery stack mounted in an upper stage of the lower-stage battery stack. The upper-stage battery stack is separated from the lower-stage battery stack in a vehicle height direction. Furthermore, a reinforcing member is arranged at a height position that matches a height position of a separation space between the upper-stage battery stack and the lower-stage battery stack in the vehicle height direction. The reinforcing member comprises a pair of transverse frames extending in the vehicle width direction and provided in the vehicle front-rear direction, and a pair of longitudinal frames connected to both ends of the pair of transverse frames in the vehicle width direction and extending in the vehicle front-rear direction, and the longitudinal frames project outward from the upper-stage battery stack in the vehicle width direction.

According to the above configuration, the longitudinal frames of the reinforcing member project outward from the upper-stage battery stack in the vehicle width direction, and therefore come in contact with the side members ahead of the upper-stage battery stack during side collision. Furthermore, the longitudinal frames are provided so that they match, in height, the separation space between the upper-stage battery stack and the lower-stage battery stack in the vehicle height direction, and the upper-stage battery stack and the lower-stage battery stack are arranged to avoid the longitudinal frames in the vehicle height direction. Therefore, loads received by the longitudinal frames in the vehicle width direction are transmitted to the transverse frames, while the loads are inhibited from being transmitted to the upper-stage battery stack and the lower-stage battery stack.

Furthermore, in the above disclosure, each longitudinal frame may include an overlap region that is aligned with the side member in terms of a position in the vehicle height direction. In this case, an auxiliary member may be provided to project further outward from the overlap region of the longitudinal frame in the vehicle width direction.

A projection width in the vehicle width direction is expanded by the auxiliary member, thereby avoiding proximity of each side member to the upper-stage battery stack. Furthermore, the auxiliary member is provided only in the overlap region. Consequently, increase in weight of the member may be suppressed, as compared with, for example, a case where the auxiliary member is provided over an entire length of the longitudinal frame in a longitudinal direction.

Furthermore, in the above disclosure, the battery pack may comprise a case tray that stores the upper-stage battery stack and the lower-stage battery stack. In this case, the upper-stage battery stack is fixed to an upper end of a plate-shaped bracket extending upward from the case tray in the vehicle front-rear direction. Furthermore, a ridgeline is formed on the bracket across the vehicle front-rear direction.

The ridgeline is provided across the vehicle front-rear direction. Consequently, rigidity of the bracket in the vehicle front-rear direction improves. On the other hand, there is concern that the ridgeline across the vehicle front-rear direction becomes a starting point of buckling deformation of the bracket during side collision. However, even in case of the buckling deformation, the auxiliary member collides with the side members ahead of the upper-stage battery stack as described above. Consequently, transmission of a collision load to the upper-stage battery stack is inhibited.

According to the present disclosure, it is possible to inhibit the transmission of the collision load to the upper-stage battery stack during the side collision, irrespective of a strength of the support member of the battery stack of the upper stage.

BRIEF DESCRIPTION OF DRAWINGS

Embodiments of the present disclosure will be described based on the following figures, wherein.

DESCRIPTION OF EMBODIMENTS

FIG. 1 to FIG. 12 illustrate a vehicle lower structure according to an embodiment of the present invention. Note that in FIG. 1 to FIG. 12, a vehicle front-rear direction is shown by an axis denoted with symbol FR, a vehicle width direction is shown by an axis denoted with symbol RW, and a vehicle up-down direction is shown by an axis denoted with symbol UP. Along the vehicle front-rear axis FR, a vehicle front direction is a forward direction. Along the vehicle width axis RW, a right width direction is a forward direction. Furthermore, along the vehicle up-down axis UP, an up direction is a forward direction. These three axes are orthogonal to one another.

Figure 1:
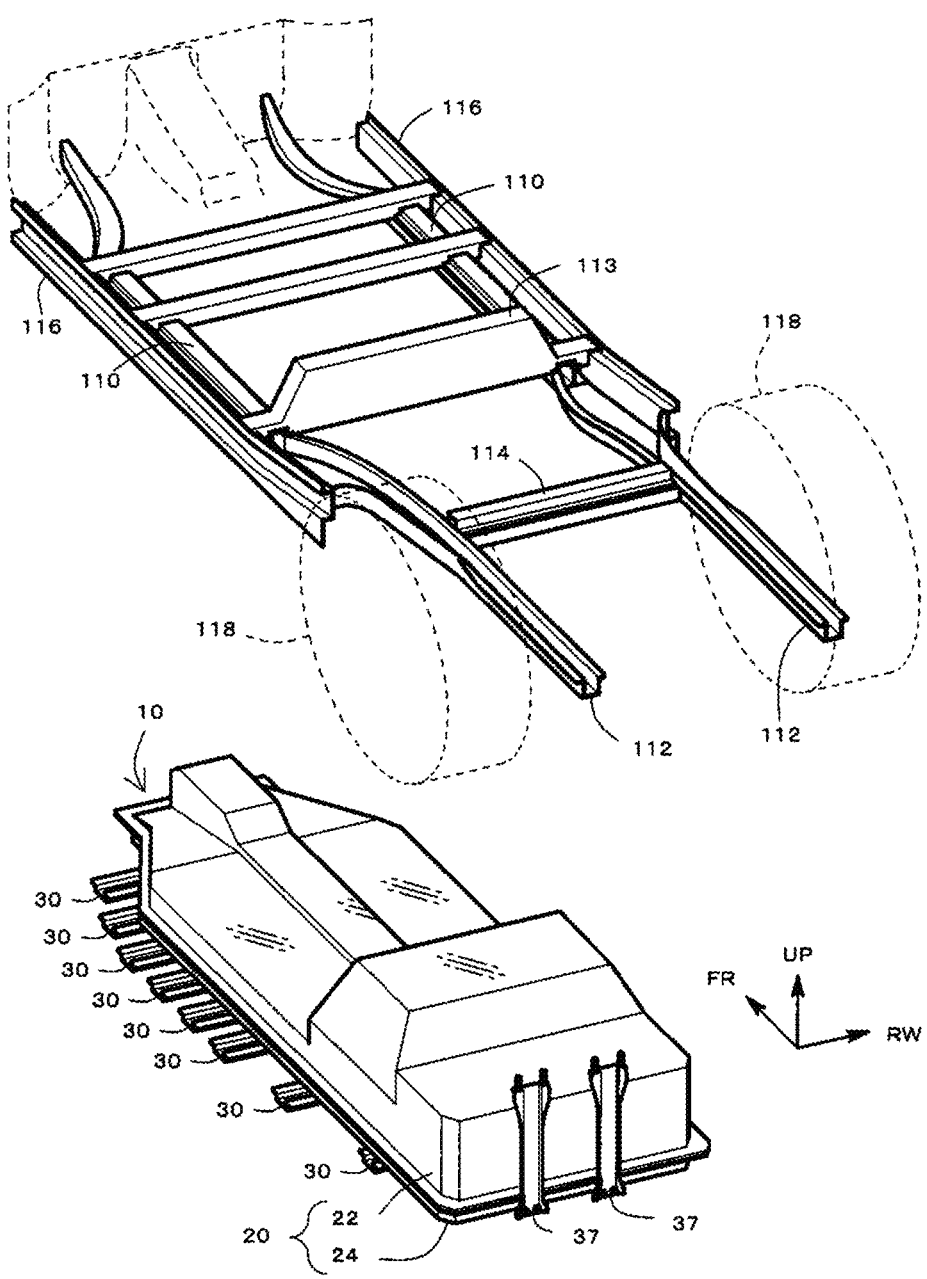
FIG. 1 is an exploded perspective view illustrating a vehicle lower structure according to the present embodiment.

FIG. 1 illustrates an exploded perspective view of the vehicle lower structure according to the present embodiment. The vehicle lower structure according to the present embodiment is mounted in, for example, an electric car. The vehicle lower structure comprises a battery pack 10, a lower frame 30, a front side member 110, and a rear side member 112.

FIG. 1 illustrates the battery pack 10 and framework members of a vehicle which support this battery pack, and secondarily shows a panel member and rear tires 118 by broken lines. The framework members of the vehicle comprise a pair of the front side members 110, 110, a pair of the rear side members 112, 112, and a pair of rockers 116, 116 as "longitudinal frames" extending in the vehicle front-rear direction. Furthermore, the framework members of the vehicle comprise a center floor cross member 113 and a rear cross member 114 as "transverse frames" extending in the vehicle width direction. Each of these members is constituted of, for example, a high-tensile steel plate or a hot stamp steel plate.

Both the pair of front side members 110 and the pair of rear side members 112 are framework members provided on both sides of a floor panel 120 (see FIG. 3) in the vehicle width direction and extending in the vehicle front-rear direction. The front side members 110 and the rear side members 112 may be grasped together as pairs of side members extending in the vehicle front-rear direction.

For example, the pair of front side members 110, 110 extend from a front compartment (not shown) ahead of a vehicle chamber to the center floor cross member 113 in the vehicle chamber. Furthermore, referring to FIG. 3, fastening portions 36 of the lower frame 30 are fastened to the front side members 110, 110. This fastening structure will be described later.

For example, each of the front side members 110, 110 comprises a front side upper member 110A that is an upper member and a front side lower member 110B that is a lower member. Each of the front side upper member 110A and the front side lower member 110B has a hat-shaped section, and the two members are superimposed onto each other to constitute a closed section.

Referring to FIG. 1, front ends of the pair of rear side members 112, 112 are connected to rear ends of the front side members 110, 110. For example, each of the rear side members 112, 112 extends from the center floor cross member 113 to a rear bumper reinforcement (not shown) at a vehicle rear end.

Figure 7:
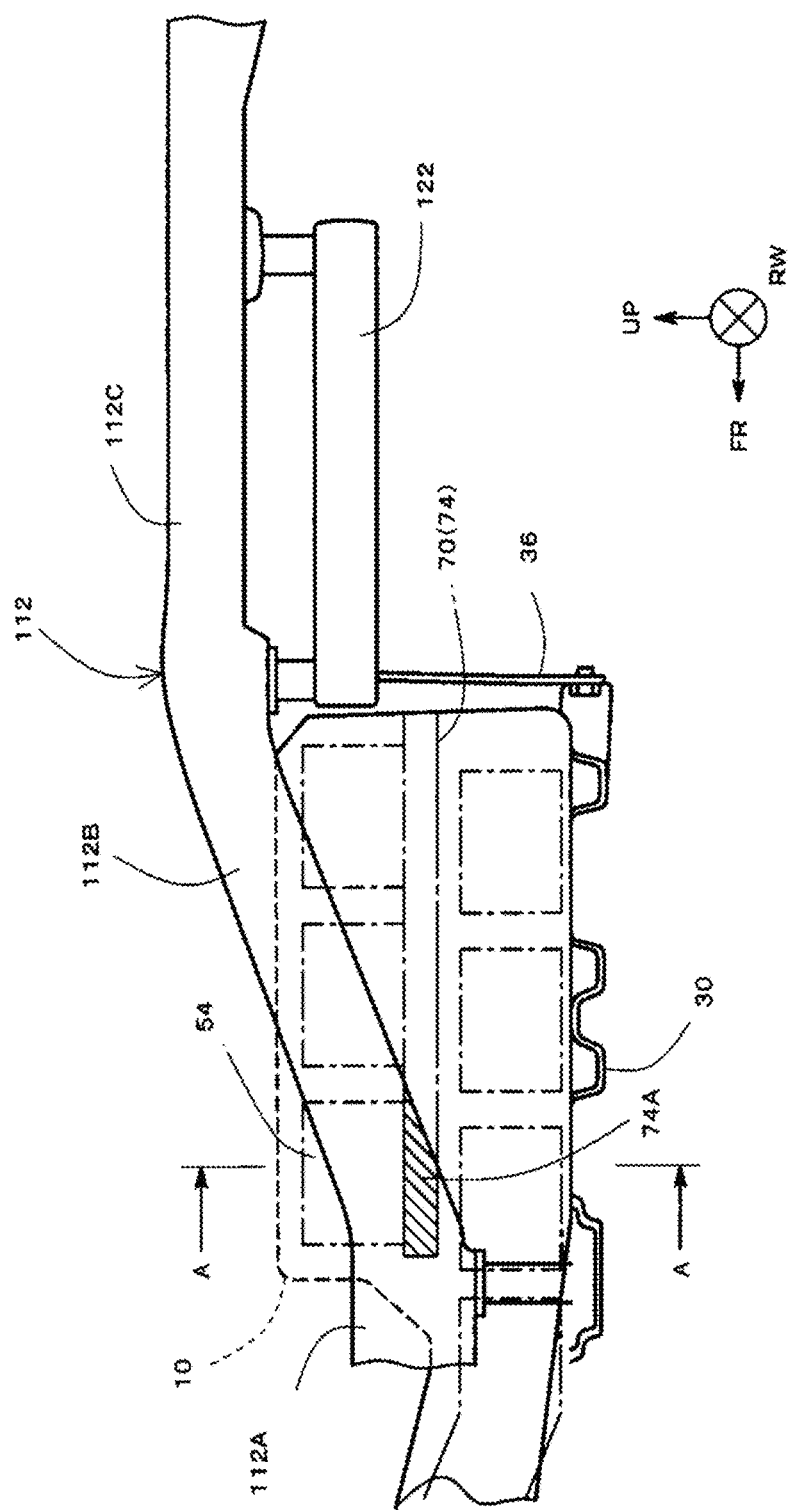
FIG. 7 is a side view illustrating a positional relation between the battery pack and a rear side member.

As shown in FIG. 1 or FIG. 7, each of the rear side members 112, 112 comprises a front horizontal portion 112A, a kick-up portion 112B, and a rear horizontal portion 112C from a front end of the member. The kick-up portion 112B is provided between the front horizontal portion 112A and the rear horizontal portion 112C, and has an inclined shape obliquely extending upward toward a rear of the vehicle. A rear suspension member 122 is fastened to the rear horizontal portion 112C. The rear suspension member 122 supports a rear suspension mechanism from which the rear tire 118 (see FIG. 1) is suspended.

Figure 8:
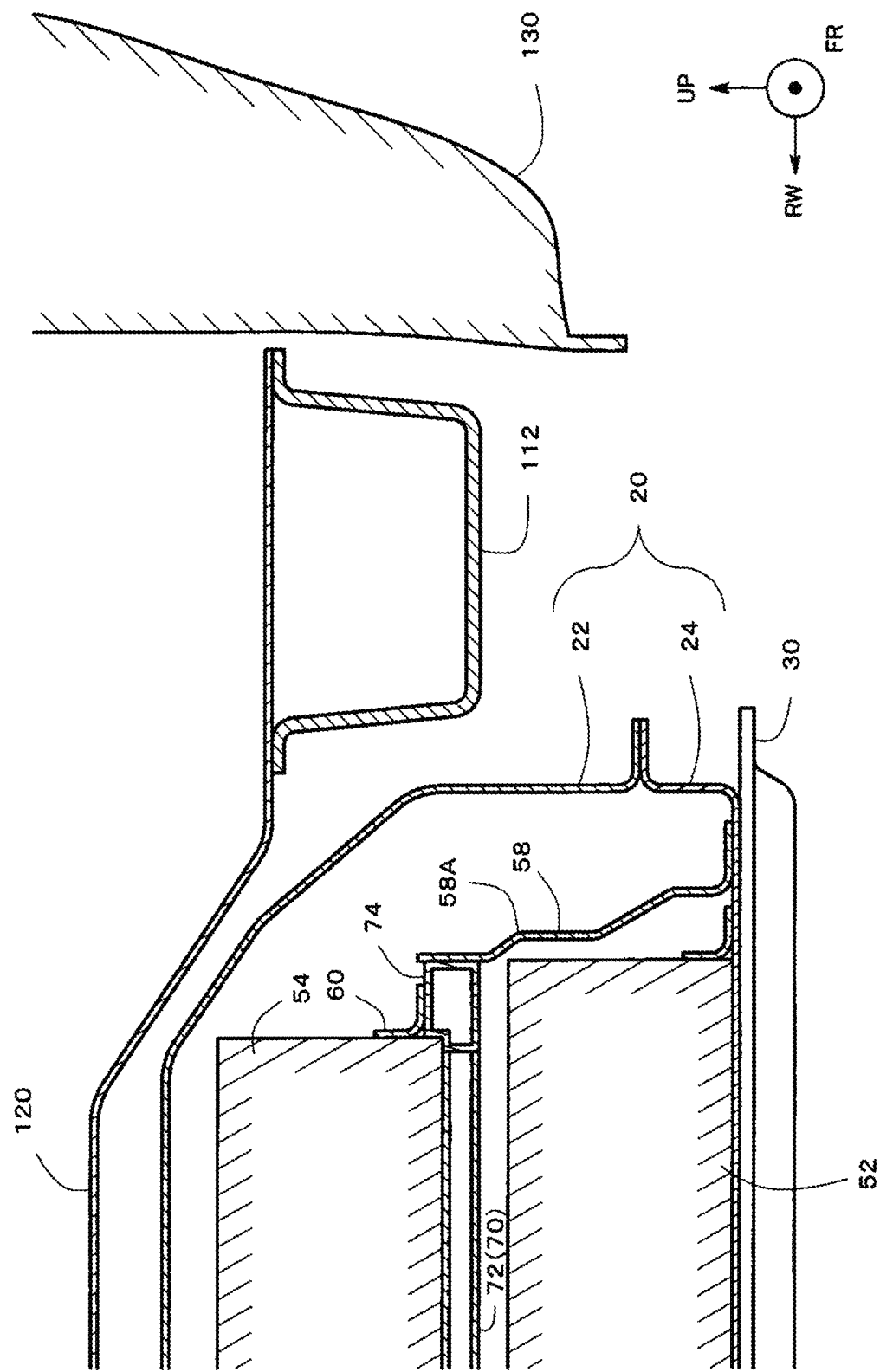
FIG. 8 is a sectional view taken along the line A-A of FIG. 7.

Furthermore, as illustrated in FIG. 8, the rear side member 112 has a hat-shaped section, and has an open end that is covered with the floor panel 120 to constitute a closed section.

Figure 2:
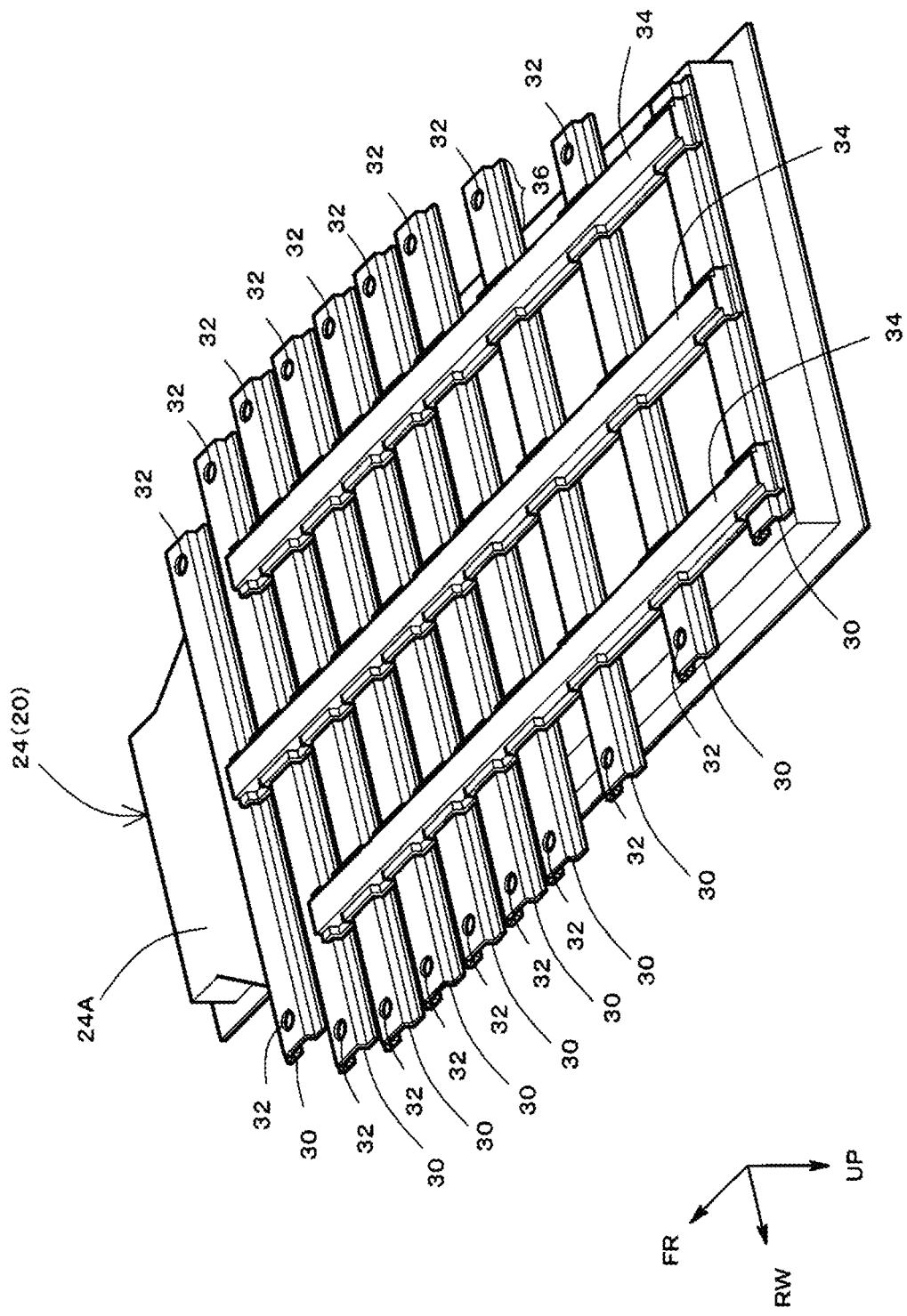
FIG. 2 is a perspective view illustrating a bottom surface structure of a battery pack.

FIG. 2 illustrates a bottom surface perspective view of a case tray 24 of the battery pack 10. A bottom surface 24A of the case tray 24 is provided with a plurality of the lower frames 30 that are the framework members. Each lower frame 30 extends in the vehicle width direction, and the respective lower frames are arranged via a space in the vehicle front-rear direction.

Additionally, a plurality of lower members 34 that are framework members are provided in the vehicle front-rear direction via a space in the vehicle width direction to straddle the respective lower frames 30, 30, . . . . Each of these framework members (the lower frames 30 and the lower members 34) is constituted of, for example, a high-tensile steel plate or a hot stamp steel plate.

The lower frames 30 excluding, for example, a rearmost end lower frame 30 are configured so that both ends of each lower frame project outward from the battery pack 10; i.e., the case tray 24, in the vehicle width direction. Such both projecting end portions become the fastening portions 36. Fastening holes 32 are made to extend through the fastening portions 36 in a thickness direction.

Figure 3:
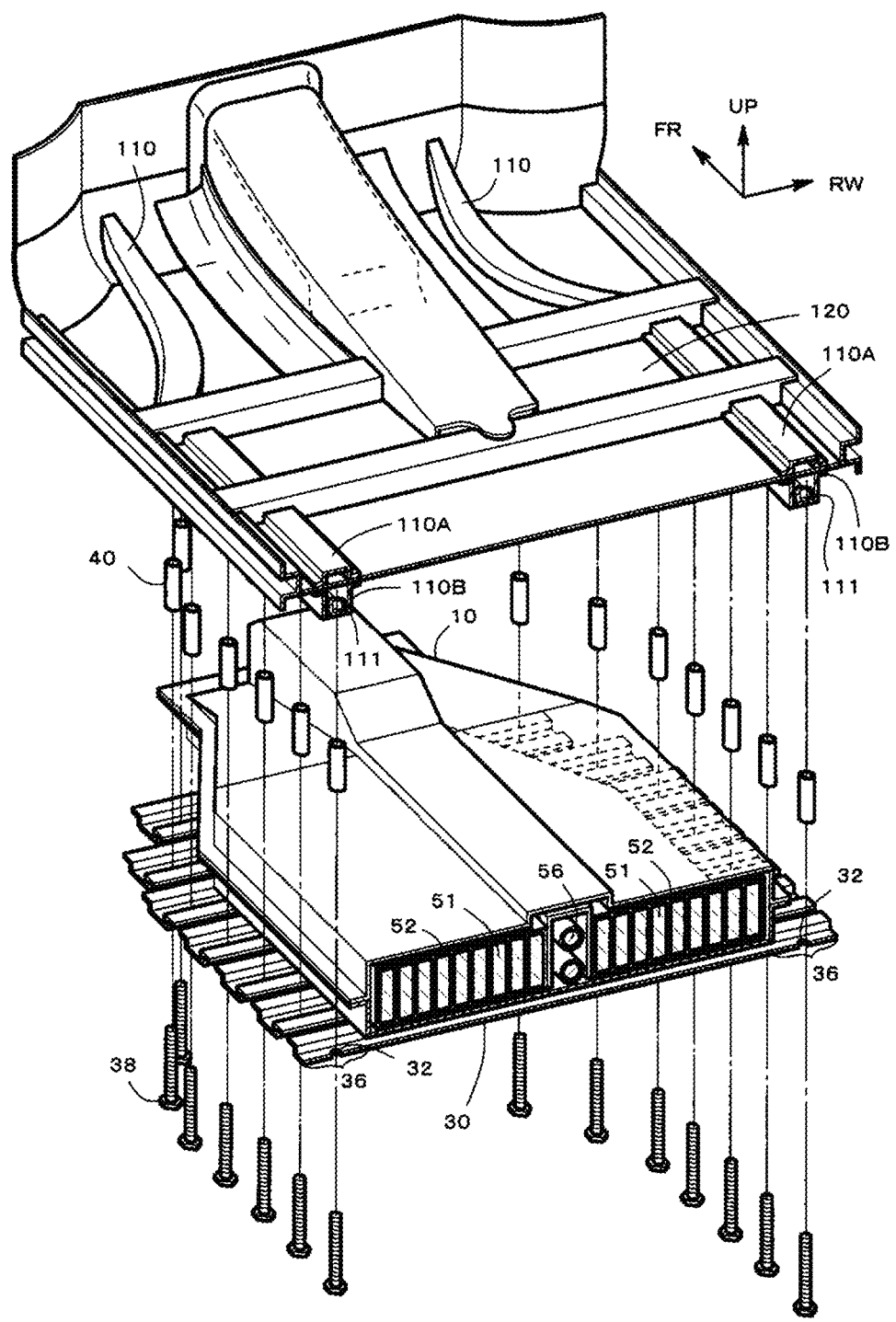
FIG. 3 is an exploded perspective view explaining a fastening example of the battery pack to side members.

As illustrated in FIG. 3, the fastening portions 36 of the lower frame 30 are fastened to the front side members 110 and 110. Specifically, bolts 38 are screwed into the fastening holes 32 of the fastening portions 36 of the lower frame 30. Furthermore, each bolt 38 is screwed into a weld nut 111 provided in the front side lower member 110B through a collar 40. The bolts are screwed into all the fastening holes 32 in this way. Consequently, the lower frame 30 and the battery pack 10 supported by this lower frame are fastened to the front side members 110, 110.

Referring to FIG. 1 again, a pair of rear brackets 37, 37 are provided at a rear end of the battery pack 10. Lower ends of the rear brackets 37, 37 are fastened to the case tray 24 of a case 20. Furthermore, upper ends of the rear brackets 37, 37 are fastened to the rear cross member 114. Thus, when the battery pack 10 is stored under the floor panel 120, the battery pack 10 is fastened to the front side members 110, 110 via the lower frame 30, and is also fastened to the rear cross member 114 via the rear brackets 37, 37.

Figure 4:
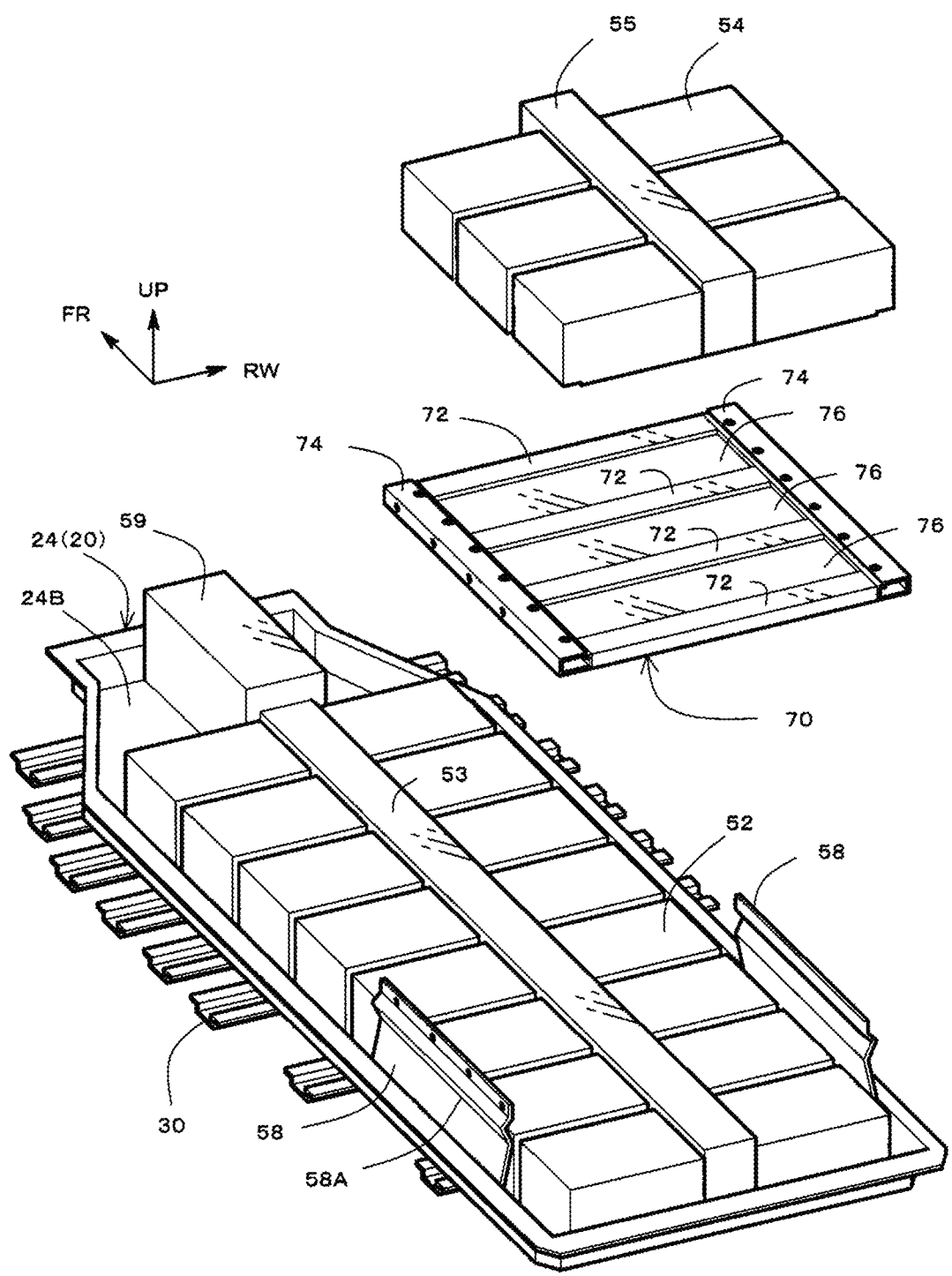
FIG. 4 is an exploded perspective view illustrating constituting members of the battery pack.

FIG. 1 illustrates the whole perspective view of the battery pack 10. Furthermore, FIG. 4 illustrates respective members stored in the case 20 in an exploded perspective view. Note that FIG. 4 omits drawing of a case cover 22. The battery pack 10 comprises the case 20, a lower-stage battery stack 52, a lower-stage center tunnel 53, an upper-stage battery stack 54, an upper-stage center tunnel 55, a support bracket 58, a battery ECU 59, and a middle frame 70.

Note that the lower-stage battery stack 52 and the upper-stage battery stack 54 are different in that each is disposed in the upper stage or the lower stage, but they have an equal (common) basic structure. Furthermore, the lower-stage battery stack 52 and the upper-stage battery stack 54 are different in that, for example, a number of battery cells 51 (see FIG. 3) stored in each stack of the upper stage is smaller than that of the battery cells stored in the stack of the lower stage, but each stack is provided with a reinforcing structure, a wire, or equipment such as a temperature sensor or a current sensor.

The case 20 stores the lower-stage battery stack 52, the upper-stage battery stack 54, the middle frame 70, and others, and comprises the case cover 22 and the case tray 24 that are upper members. Referring to FIG. 1, a shape of the case cover 22 is determined in accordance with arrangement of members to be stored in the case 20. For example, referring to FIG. 4 and FIG. 6, the upper-stage battery stack 54 is brought to and disposed in a rear of the case 20. Consequently, a rear of the case cover 22 has a shape that bulges further upward than does a front of the case cover.

The case tray 24 has a boat shape, and on the bottom surface 24A (see FIG. 2) of the case tray, the lower frame 30 and the lower members 34 described above are provided. Referring to FIG. 4, an upper surface 24B (a case inner surface) of the case tray 24 is in a form of a flat plate, and on the upper surface 24B, there are stored the battery ECU 59, the lower-stage battery stack 52, the lower-stage center tunnel 53, the upper-stage battery stack 54, the upper-stage center tunnel 55, the middle frame 70, and others.

The battery ECU 59 manages charging/discharging of the lower-stage battery stack 52 and the upper-stage battery stack 54, and manages temperatures of these stacks. For example, the battery ECU 59 is an electronic control unit constituted of a computer. The battery ECU 59 is disposed in a front end portion of the case 20 in the vehicle front-rear direction, and is connected to a power control unit (not shown) such as a DC/DC converter or an inverter provided in the front compartment (not shown), via a high-voltage cable or the like.

Furthermore, a plurality of the lower-stage battery stacks 52 are arranged in the case tray 24. For example, the plurality of lower-stage battery stacks 52 are arranged in the vehicle front-rear direction, via the lower-stage center tunnel 53 disposed at a center in the vehicle width direction. A plurality of battery cells 51 (see FIG. 3) are stored in the respective lower-stage battery stacks 52.

Furthermore, each of the lower-stage battery stacks 52 is fixed (fastened) to the lower frame 30 via an unshown bracket or the like in the case. Consequently, for example, during side collision of the vehicle, there is maintained a state where the lower-stage battery stack 52 is supported by and fixed to the lower frame 30.

The lower-stage center tunnel 53 is provided between the lower-stage battery stacks 52, 52 arranged side by side in the vehicle width direction. For example, the lower-stage center tunnel 53 extends from a rear end of the battery ECU 59 to a rear end of the case tray 24 in the vehicle front-rear direction. For example, a high-voltage cable 56 (see FIG. 3) is disposed (routed) in the lower-stage center tunnel 53.

The upper-stage battery stacks 54 are mounted on the rear lower-stage battery stacks 52 among the plurality of lower-stage battery stacks 52. For example, when the lower-stage battery stacks 52 are arranged in eight rows in the vehicle front-rear direction, the upper-stage battery stacks 54 are mounted on three rear rows of the lower-stage battery stacks 52.

Here, if both the stacks are directly stacked so that a bottom surface of the upper-stage battery stack 54 is located on a top surface of the lower-stage battery stack 52, there is concern that heat generated by the lower-stage battery stack 52 encounters difficulty escaping to the outside. To solve the problem, for example, a heat dissipating space is provided, or a space is provided as a flow path of cooling air above the lower-stage battery stack 52.

Thus, when the upper-stage battery stack 54 is separated from and stacked above the lower-stage battery stack 52 in the vehicle height direction, the support bracket 58 and the middle frame 70 are provided.

Figure 5:
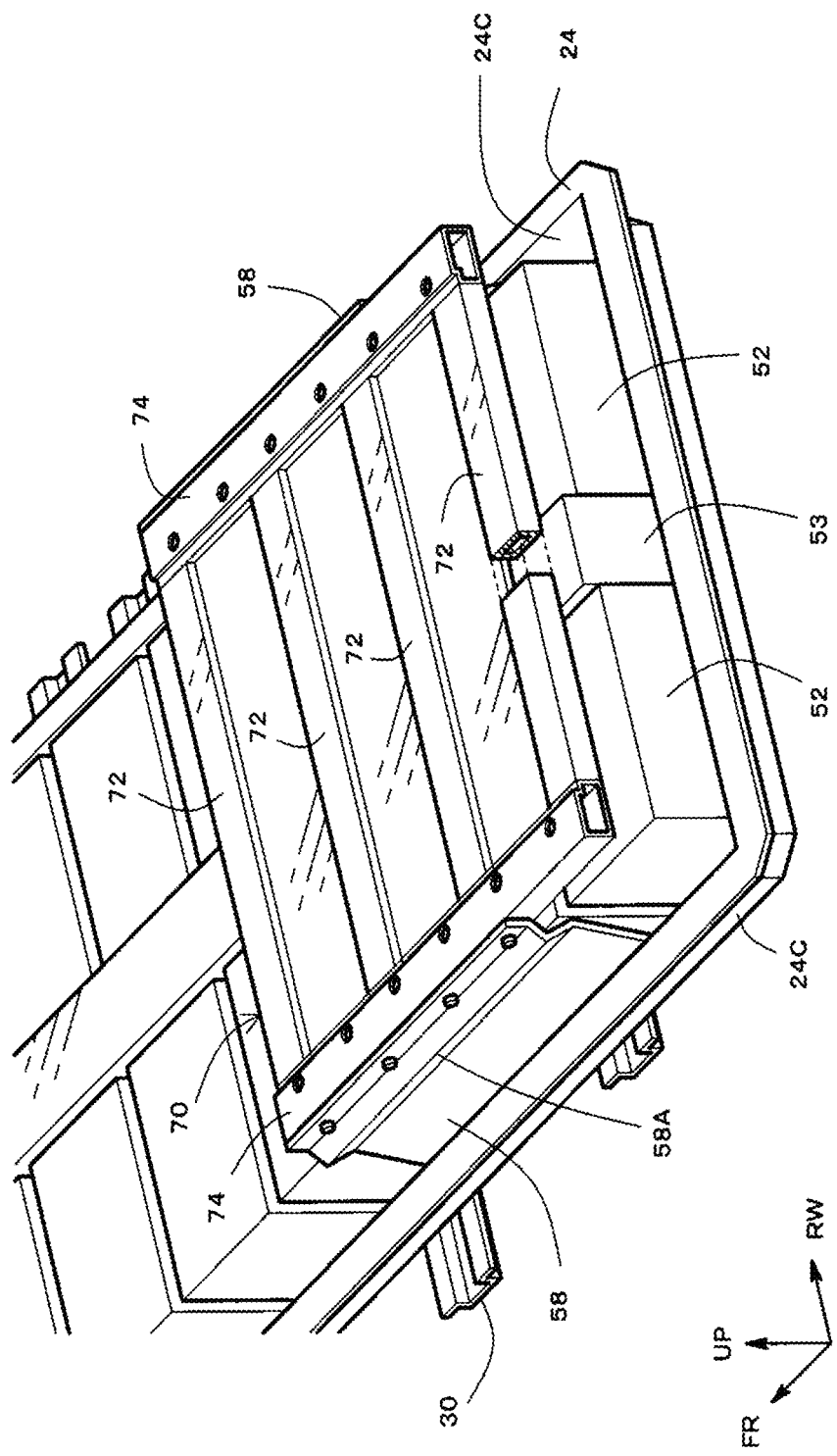
FIG. 5 is a perspective view showing an example where a middle frame is fastened to a support bracket.

Referring to FIG. 4 and FIG. 5, the support bracket 58 is a plate-shaped support metal fitting that extends upward from the upper surface 24B (a case inner surface) of the case tray 24 in the vehicle front-rear direction. The support bracket 58 may extend, for example, over a total length of three rows of upper-stage battery stacks 54 arranged in the vehicle front-rear direction, but may extend, for example, along a length of about two rows, which is shorter than the total length. Consequently, for example, a side of the lower-stage battery stack 52 in the vehicle width direction is opened in a rearmost row in the vehicle front-rear direction. Consequently, a heat dissipation path is acquired in the corresponding region.

A height of the support bracket 58 (a length in the vehicle height direction) is determined so that a space is provided between the middle frame 70 and the lower-stage battery stack 52. For example, a value obtained by adding a predetermined margin (a space height) to a height of the lower-stage battery stack 52 and a thickness of the middle frame 70 is determined as the height of the support bracket 58.

Furthermore, as illustrated in FIG. 5, a ridgeline 58A is formed on the support bracket 58 across the vehicle front-rear direction. For example, the support bracket 58 is provided with a bent portion obtained by forming a step in a flat plate, and the ridgeline 58A is formed as a folded line of the bent portion in the vehicle front-rear direction.

Thus, the ridgeline 58A is formed in the vehicle front-rear direction, so that load bearing properties of the support bracket 58 in the vehicle front-rear direction improve. For example, the upper-stage battery stack 54 on the middle frame 70 is energized rearward or forward at sudden start or sudden stop, but the support bracket 58 may support the upper-stage battery stack 54 against such energization in the vehicle front-rear direction.

On the other hand, the support bracket 58 easily causes buckling deformation from a start point of the ridgeline 58A due to the energization in the vehicle width direction, for example, during side collision of the vehicle or the like. However, a longitudinal frame 74 of the middle frame 70 comes in contact with the rear side member 112 ahead of the upper-stage battery stack 54 as described later. Consequently, transmission of a collision load to the upper-stage battery stack 54 is inhibited.

A pair of the support brackets 58 are arranged in a gap provided between side walls 24C, 24C of the case tray 24 in the vehicle width direction and the lower-stage battery stack 52. A lower end of the support bracket 58 is fastened to, for example, the lower frame 30.

Furthermore, the upper-stage battery stack 54 and the upper-stage center tunnel 55 are fixed to upper ends of the pair of support brackets 58, 58 via the middle frame 70.

That is, the middle frame 70 is fastened and held between the upper ends of the pair of support brackets 58, 58. The upper-stage battery stacks 54 and the upper-stage center tunnel 55 are arranged on the middle frame 70.

Additionally, the lower-stage battery stacks 52 are provided under the middle frame 70. Based on such arrangement, in particular, transverse frames 72 and longitudinal frames 74 of the middle frame 70 may be grasped as reinforcing members provided so that their vehicle height positions are aligned with a spaced region from the lower-stage battery stack 52 and the upper-stage battery stack 54.

The middle frame 70 comprises the transverse frame 72, the longitudinal frame 74, and a plate 76. A plurality of transverse frames 72 extending in the vehicle width direction are arranged via a space in the vehicle front-rear direction. For example, in an example shown in FIG. 5, four transverse frames 72 are provided. As shown in a partially sectional view of FIG. 5, for example, each transverse frame 72 is constituted of a square steel pipe. As described later, the transverse frame 72 is constituted of a high-tensile steel material to resist the collision load from the rear side member 112 during the side collision of the vehicle.

The plate 76 is provided between the adjacent transverse frames 72 and 72. The plate 76 is constituted of a metal plate such as an iron plate or an aluminum plate. For example, from a viewpoint of promoting the heat dissipation from the bottom surface of the upper-stage battery stack 54, the plate 76 may be omitted.

A pair of the longitudinal frames 74 are provided at both ends of the middle frame 70 in the vehicle width direction. The longitudinal frames 74 are frame members extending in the vehicle front-rear direction, and are connected to both ends of each of pairs of transverse frames 72, 72 in the vehicle width direction, the pairs being arranged at a front end and a rear end of the middle frame 70 in the vehicle front-rear direction. For example, as illustrated in FIG. 5, each longitudinal frame 74 is constituted of a square steel pipe. Furthermore, the longitudinal frame 74 is constituted of, for example, a high-tensile steel material in the same manner as in the transverse frame 72.

For example, an upper surface of the longitudinal frame 74 is formed in a stepped shape in which an inner side in the vehicle width direction is recessed relative to an outer side. This stepped shape is utilized in positioning the upper-stage battery stack 54 when mounting the stack.

Figure 6:
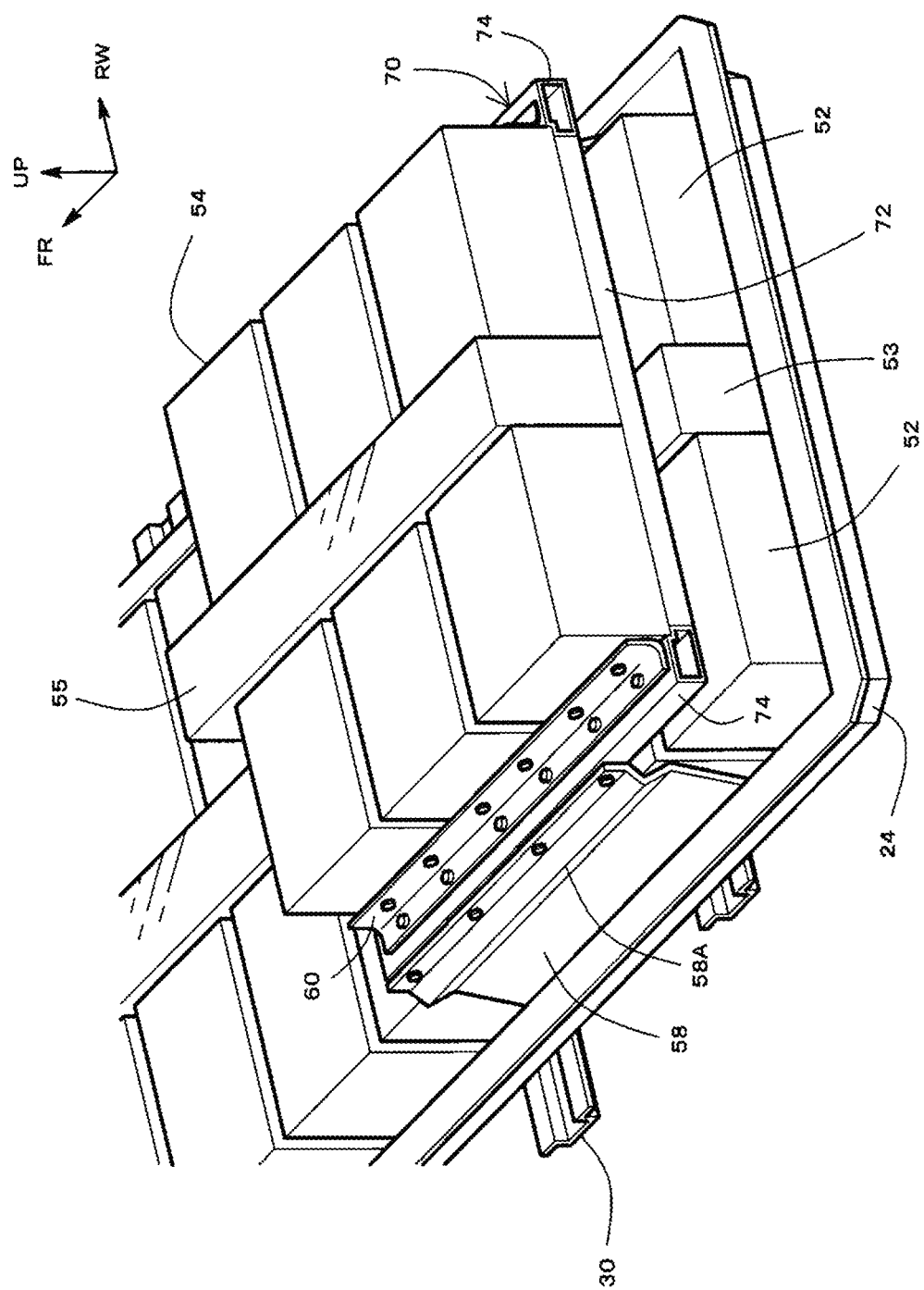
FIG. 6 is a perspective view showing an example where an upper-stage battery stack and an upper-stage center tunnel are arranged on the middle frame.

Furthermore, as illustrated in FIG. 6, a pair of the longitudinal frames 74, 74 project outward from the upper-stage battery stack 54 in the vehicle width direction. For example, in the above stepped shape, a surface that corresponds to an upper step of the stepped portion projects outward from the upper-stage battery stack 54 in the vehicle width direction.

The longitudinal frame 74 projects outward from the upper-stage battery stack 54 in the vehicle width direction. Consequently, as described later, the longitudinal frame 74 comes in contact with the rear side member 112 to receive the collision load ahead of the upper-stage battery stack 54 during the side collision of the vehicle. In consequence, transmission of the collision load to the upper-stage battery stack 54 is inhibited.

Note that as illustrated in FIG. 8, in a spatial relation between the case 20 and each surrounding vehicle part, an outer surface of the lower-stage battery stack 52 in the vehicle width direction is positioned in the vehicle width direction to substantially coincide with an outer surface of the longitudinal frame 74 in the vehicle width direction. Consequently, the upper-stage battery stack 54 is configured so that a number of the battery cells 51 (see FIG. 3) to be stacked per upper-stage battery stack is smaller than that per lower-stage battery stack 52.

Referring to FIG. 6, the upper-stage battery stack 54 is fastened to the middle frame 70 via an L-shaped bracket 60.

The L-shaped bracket 60 is an L-shaped fixing metal fitting in front view, in which one piece that constitutes an L-shape abuts on an outer surface of the upper-stage battery stack 54 in the vehicle width direction, while the other piece abuts on the upper surface of the longitudinal frame 74.

FIG. 7 illustrates a side view showing a positional relation between the rear side member 112 and the battery pack 10. The middle frame 70 and the upper-stage battery stack 54 have a positional relation of being partially aligned with the kick-up portion 112B of the rear side member 112 in the vehicle height direction. For example, all the three rows of upper-stage battery stacks 54 arranged in the vehicle front-rear direction are partially aligned with the kick-up portion 112B in terms of a position in the vehicle height direction. Furthermore, the middle frame 70 and the longitudinal frame 74 are aligned with the kick-up portion 112B in terms of a position in the vehicle height direction in a front part; i.e., in an overlap region 74A hatched in FIG. 7.

FIG. 8 illustrates a front sectional view taken along the line A-A of FIG. 7; i.e., including the overlap region 74A. As illustrated in this drawing, the longitudinal frame 74 of the middle frame 70 is aligned with the rear side member 112 in terms of a position in the vehicle height direction. Furthermore, a large part of the upper-stage battery stack 54 is also aligned with the rear side member 112 in terms of a position in the vehicle height direction.

Figure 9:
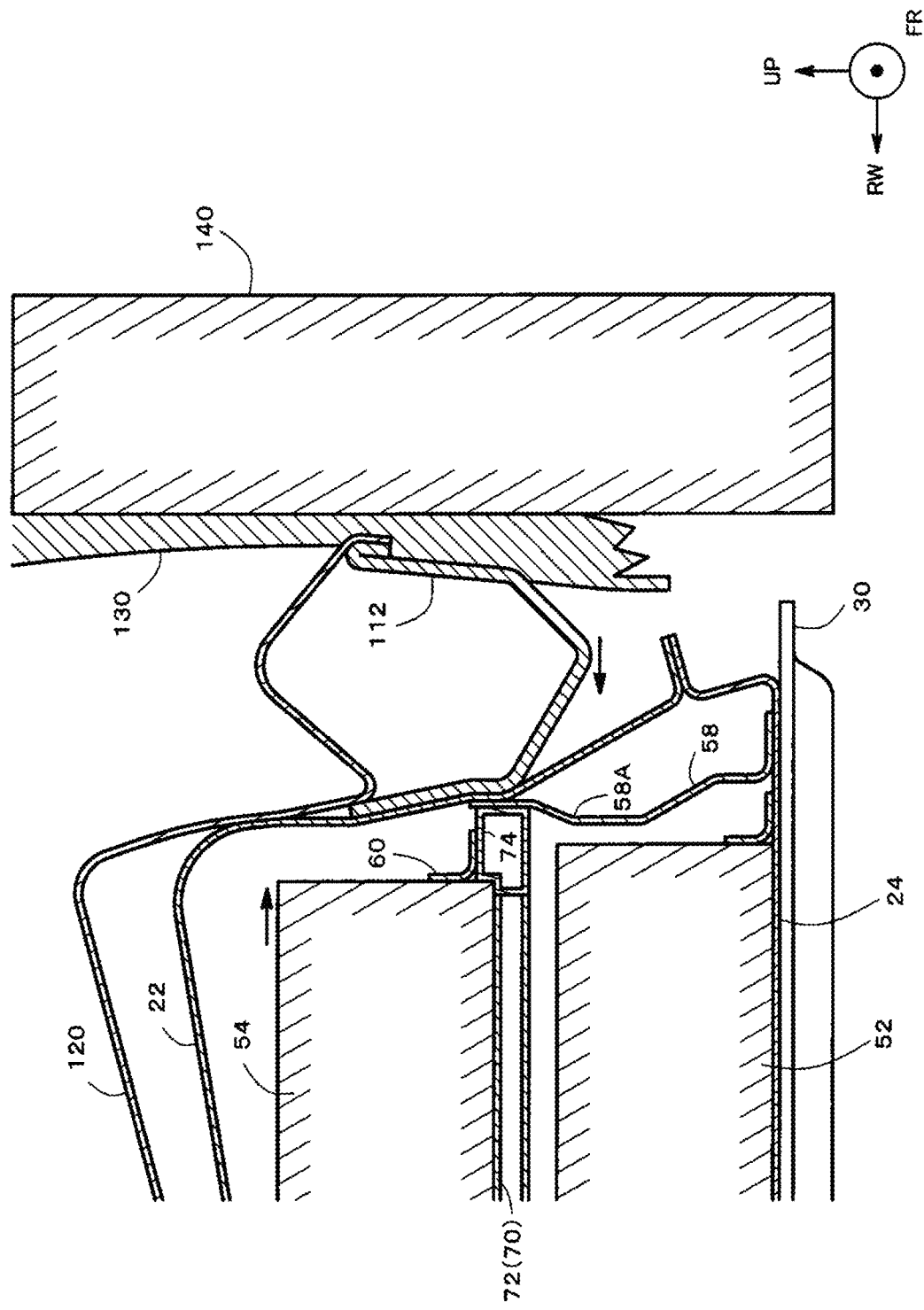
FIG. 9 is a sectional view taken along the line A-A and showing a behavior during side collision with a pole.

FIG. 9 illustrates a behavior during the side collision of the vehicle in a front sectional view similar to FIG. 8. For example, an obstacle is a roadside pole 140. Examples of the pole 140 include a telephone pole and a standing tree. For example, a collision area of the pole 140 with the vehicle is smaller than that of a collision object such as a wall. Therefore, the pole 140 is easily dented inward in the vehicle width direction while the vehicle is not sufficiently slowed down.

Referring to FIG. 9, when a side surface of the vehicle collides with the pole 140, the battery pack 10 that is a heavy weight is energized outward in the vehicle width direction due to inertia. Here, the lower-stage battery stack 52 in the battery pack 10 is fastened to the front side member 110 via the lower frame 30. Based on such a fastening structure, relative positions of the lower-stage battery stack 52 and the rear side member 112 coupled to the front side member 110 are maintained at least in an initial stage even during the side collision.

On the other hand, when the upper-stage battery stack 54 is energized outward in the vehicle width direction due to the inertia, the upper end of the support bracket 58 undergoes buckling deformation outward in the vehicle width direction from the ridgeline 58A of the support bracket 58 which is a deformation starting point. As a result, the upper-stage battery stack 54 and the middle frame 70 that supports this stack are moved outward in the vehicle width direction. That is, the upper-stage battery stack 54 comes close to the rear side member 112.

When a side collision process proceeds, the pole 140 enters a rear side door 130 inward in the vehicle width direction while deforming the door. Furthermore, the rear side member 112 receives the pole 140 via the rear side door 130. Consequently, the rear side member 112 comes inward in the vehicle width direction while deforming its closed sectional shape.

Thus, the upper-stage battery stack 54 and the middle frame 70 that follow the deformation of the support bracket 58 to be moved outward in the vehicle width direction come close to the rear side member 112 pushed inward in the vehicle width direction as the pole 140 enters the member.

At this time, the longitudinal frame 74 that projects from the upper-stage battery stack 54 outward in the vehicle width direction comes in contact with the rear side member 112 ahead of the upper-stage battery stack 54 to receive a collision load of the member.

When receiving the collision load, the longitudinal frame 74 is pushed inward in the vehicle width direction. Here, the longitudinal frame 74 (and the middle frame 70) is provided in a separation space between the upper-stage battery stack 54 and the lower-stage battery stack 52. The upper-stage battery stack 54 and the lower-stage battery stack 52 are arranged to avoid the longitudinal frame 74 in the vehicle height direction. In other words, the upper-stage battery stack 54 and the lower-stage battery stack 52 are arranged to come away from a load transmission path, when the load in the vehicle width direction is input into the longitudinal frame 74. Therefore, even when the longitudinal frame 74 is pushed inward in the vehicle width direction, transmission of the collision load to the upper-stage battery stack 54 and the lower-stage battery stack 52 is inhibited, and the collision load is transmitted mainly to the transverse frame 72. Furthermore, the longitudinal frame 74 is inhibited from being pushed inward in the vehicle width direction because the transverse frame 72 stretches.

Consequently, in the present embodiment, the middle frame 70 having the longitudinal frame 74 is provided in the separation space between the upper-stage battery stack 54 and the lower-stage battery stack 52. Consequently, transmission of the collision load to the upper-stage battery stack 54 and the lower-stage battery stack 52 during the vehicle side collision is inhibited.

<First Alternative Example of Vehicle Lower Structure According to Present Embodiment>

Note that in the example of FIG. 6, the longitudinal frame 74 projects further outward from a fastening space in which the L-shaped bracket 60 is fastened in the vehicle width direction, over the total length in the vehicle front-rear direction, but the vehicle lower structure according to the present embodiment is not limited to this configuration.

For example, the outward projection from this fastening space may be limited to a portion in contact with the rear side member 112.

Figure 10:
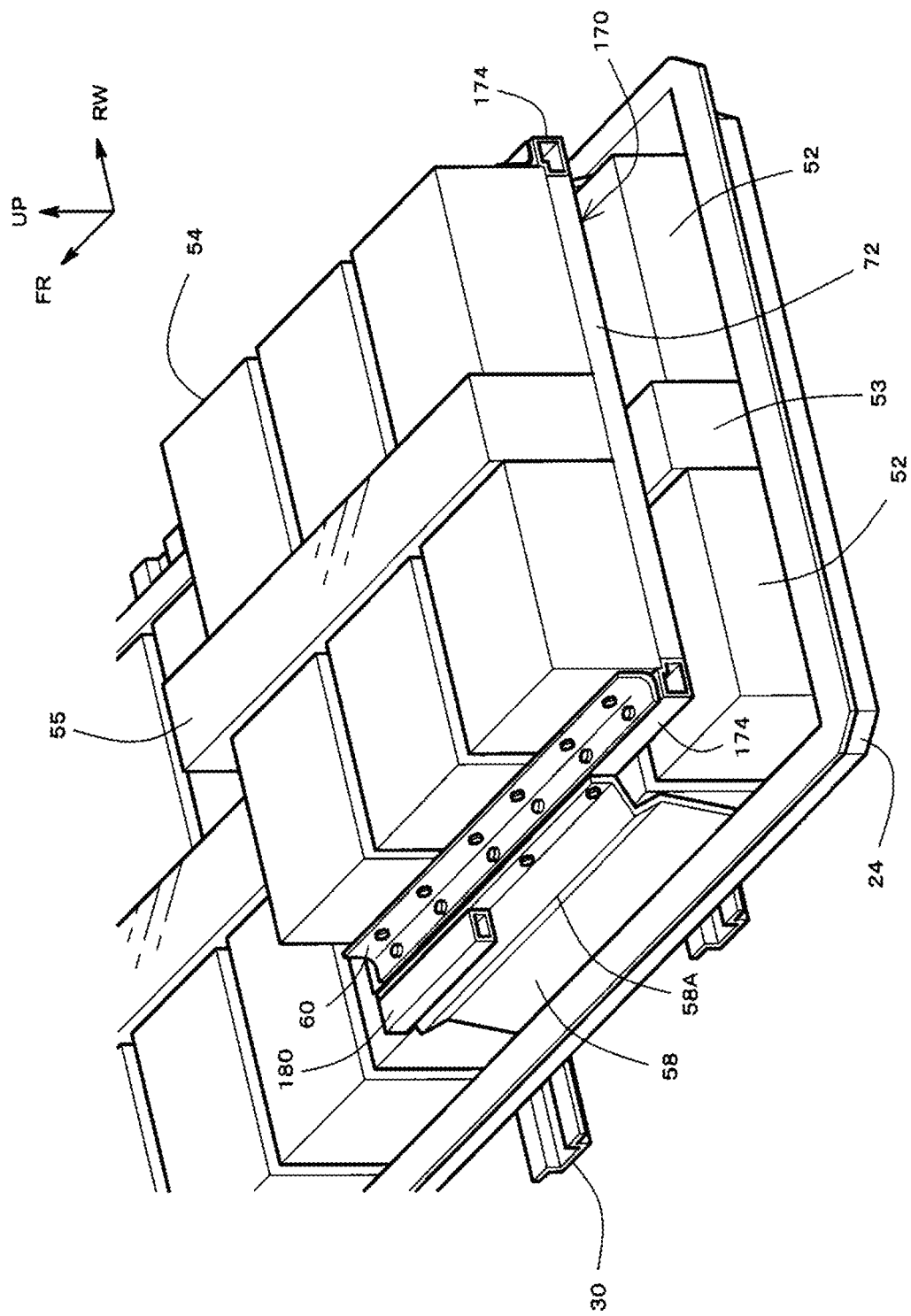
FIG. 10 is a perspective view showing a first alternative example of the vehicle lower structure according to the present embodiment, and showing an example where an auxiliary member is attached to a side of a longitudinal frame.

FIG. 10 shows a first alternative example of the vehicle lower structure according to the present embodiment. This example is different from the embodiment of FIG. 6 in comprising a middle frame 170 and an auxiliary member 180. The middle frame 170 comprises a longitudinal frame 174. Note that a configuration of a transverse frame 72 or the like may be similar to that of the embodiment of FIG. 6.

A dimension of the longitudinal frame 174 in a vehicle width direction is limited to a fastening space of an L-shaped bracket 60. Furthermore, there are provided auxiliary members 180 that project outward from a pair of longitudinal frames 174, 174 in the vehicle width direction via support brackets 58.

Each auxiliary member 180 may be, for example, a square steel tube in the same manner as in the longitudinal frame 174. Additionally, the auxiliary member 180 is configured to project further outward from the overlap region 74A of the longitudinal frame 74 and the rear side member 112 shown in FIG. 7 in the vehicle width direction, in the longitudinal frame 174. For example, the auxiliary member 180 has a length that is about ⅓ of a total length of the longitudinal frame 174 in a vehicle front-rear direction, and is disposed ahead of the longitudinal frame 174.

Thus, a member that projects outward in the vehicle width direction (the auxiliary member 180) is provided only in the overlap region 74A. Consequently, as compared with a case where the longitudinal frame 174 projects outward to a region that does not overlap with a rear side member 112 in the vehicle width direction, a volume of the middle frame 170 can be effectively decreased.

<Second Alternative Example of Vehicle Lower Structure According to Present Embodiment>

Figure 11:
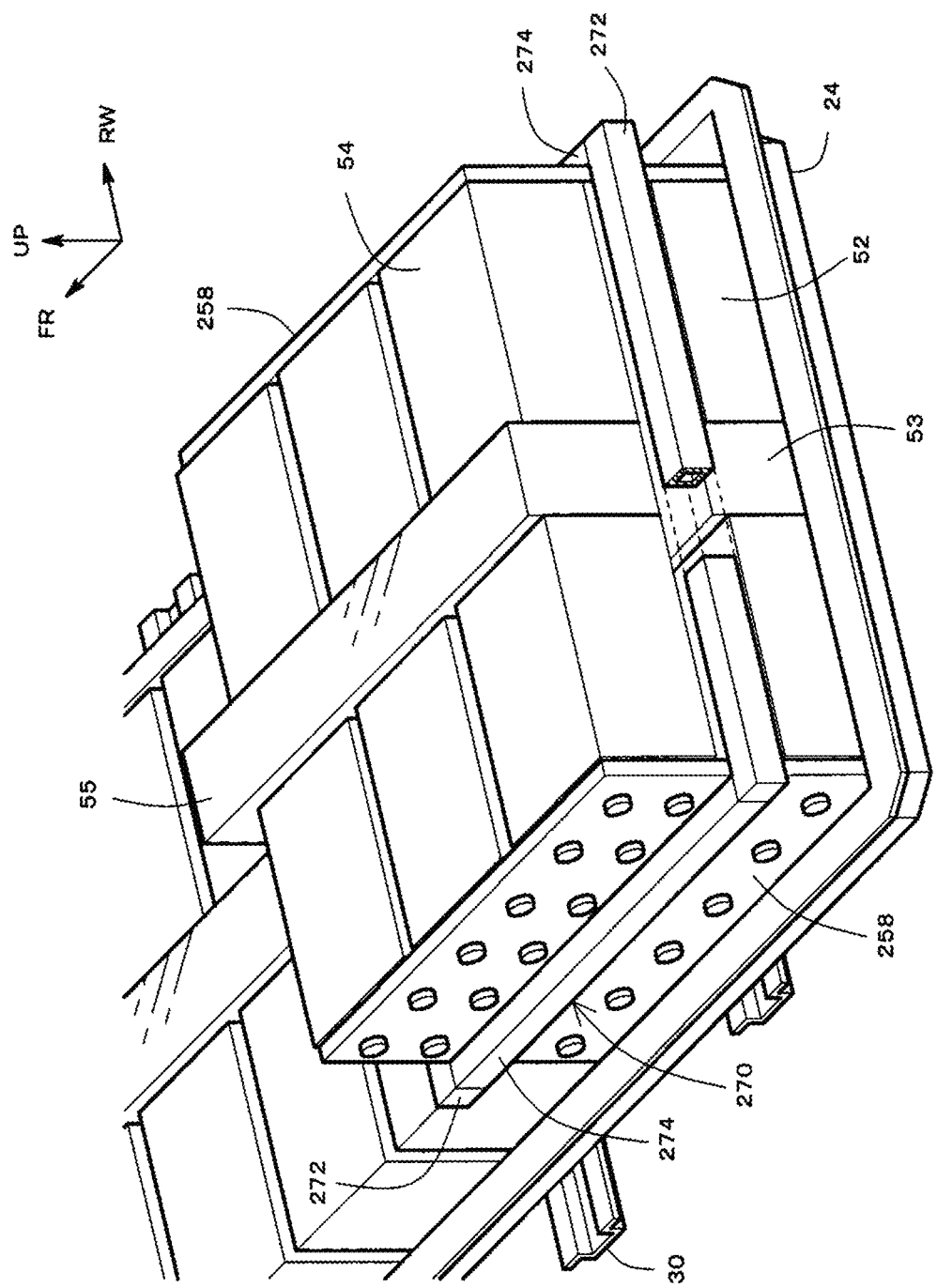
FIG. 11 is a perspective view showing a second alternative example of the vehicle lower structure according to the present embodiment.

In each of the examples of FIG. 6 and FIG. 10, the upper-stage battery stack 54 and the upper-stage center tunnel 55 are arranged in the middle frame 70 or 170, but the vehicle lower structure according to the present embodiment is not limited to the above aspect. FIG. 11 shows a second alternative example of the vehicle lower structure according to the present embodiment. This example is different from the embodiment of FIG. 6 in that an upper-stage battery stack 54 and an upper-stage center tunnel 55 are supported only by a pair of support brackets 258, 258. Furthermore, the example of FIG. 11 is different from the embodiment of FIG. 6 in that a square frame-shaped middle frame 270 is arranged at a height position that matches a height position of a separation space between the upper-stage battery stack 54 coupled to the upper-stage center tunnel 55 and the lower-stage battery stack 52 coupled to the lower-stage center tunnel 53 in the vehicle height direction.

The pair of support brackets 258, 258 are, for example, plate-shaped support members that extend upward from an upper surface 24B (see FIG. 4) of a case tray 24 in a vehicle front-rear direction. For example, each support bracket 258 extends over a total length of upper-stage battery stacks 54 arranged in three rows in the vehicle front-rear direction.

Upper portions of inner surfaces of the pair of support brackets 258, 258 in a vehicle width direction abut on and are fastened to outer surfaces of the upper-stage battery stack 54 in the vehicle width direction. Furthermore, an inner surface of the upper-stage battery stack 54 in the vehicle width direction abuts on and is fastened to a side surface of the upper-stage center tunnel 55. That is, the upper-stage battery stack 54 and the upper-stage center tunnel 55 are fastened to each other in the vehicle width direction.

In such a configuration, the upper-stage battery stack 54 and the upper-stage center tunnel 55 are separated from the lower-stage battery stack 52 and the lower-stage center tunnel 53 in the vehicle height direction. The square frame-shaped middle frame 270 is provided to match, in height, the separation space in the vehicle height direction, and to surround the separation space.

The middle frame 270 comprises a transverse frame 272 and a longitudinal frame 274. A pair of the transverse frames 272 each extending in the vehicle width direction are provided in the vehicle front-rear direction. The longitudinal frames 274 extend in the vehicle front-rear direction and are connected to both ends of the pair of transverse frames 272, 272 in the vehicle width direction. The longitudinal frame 274 projects outward from the upper-stage battery stack 54 in the vehicle width direction.

Also in this configuration, during side collision of a vehicle, the longitudinal frame 274 of the middle frame 270 comes in contact with a rear side member 112 ahead of the upper-stage battery stack 54 to receive a collision load. Furthermore, the upper-stage battery stack 54 and the lower-stage battery stack 52 are provided to avoid the middle frame 270 in the vehicle height direction. Consequently, transmission of a collision load received by the middle frame 270 to the upper-stage battery stack 54 and the lower-stage battery stack 52 is inhibited, and the collision load is transmitted mainly to the transverse frame 272.

<Third Alternative Example of Vehicle Lower Structure According to Present Embodiment>

Figure 12:
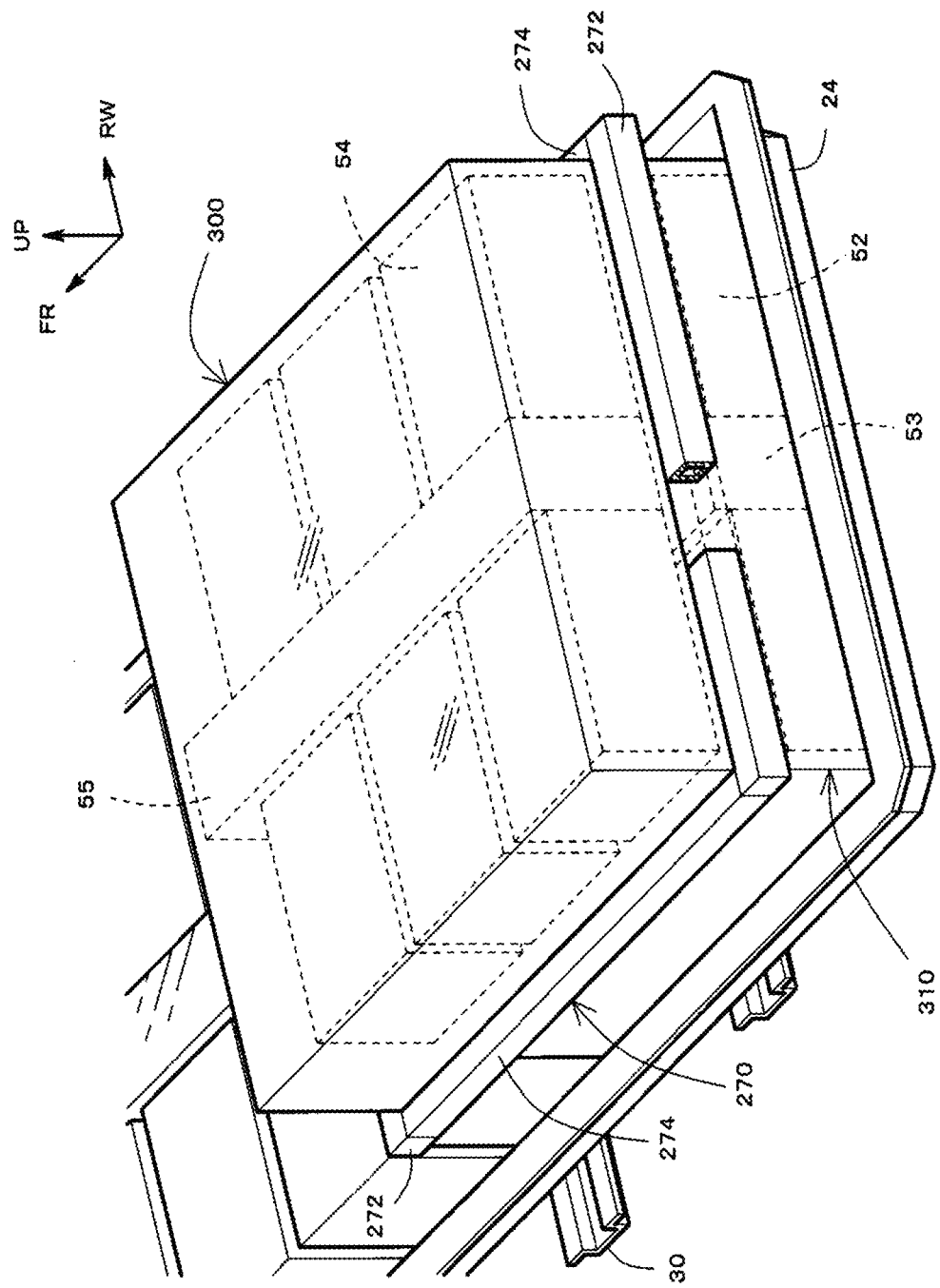
FIG. 12 is a perspective view showing a third alternative example of the vehicle lower structure according to the present embodiment.

FIG. 12 shows still another example different from FIG. 6, FIG. 10, and FIG. 11. In FIG. 11, any support brackets are not provided, and an upper-stage battery stack 54 is stacked onto a lower-stage battery stack 52.

In the example illustrated in FIG. 12, the lower-stage battery stack 52 and a lower-stage center tunnel 53 are stored in a lower-stage case 310. The lower-stage case 310 is fastened to a lower frame 30 via an unshown bracket or the like.

The lower-stage case 310 is, for example, a housing made of a resin. A top wall (an upper wall) of the case is separated vertically from upper surfaces of the lower-stage battery stack 52 and the lower-stage center tunnel 53 in a vehicle height direction. In other words, a space is provided between each of the upper surfaces of the lower-stage battery stack 52 and the lower-stage center tunnel 53 and the top wall of the lower-stage case 310.

The upper-stage battery stack 54 and an upper-stage center tunnel 55 are stored in an upper-stage case 300. The upper-stage case 300 is, for example, a housing made of a resin, and is disposed directly on the lower-stage case 310. The upper-stage case 300 and the lower-stage case 310 are fixed to each other, for example, with screws, fitting, a band, or the like.

As described above, the space is provided between each of the upper surfaces of the lower-stage battery stack 52 and the lower-stage center tunnel 53 and the top wall of the lower-stage case 310. Therefore, a separation space is defined to separate, in the vehicle height direction, the lower-stage battery stack 52 from the upper-stage battery stack 54 via the lower-stage case 310 and the upper-stage case 300. A middle frame 270 is provided to match, in height, the separation space in the vehicle height direction, and to surround the separation space.

The middle frame 270 is similar to the middle frame 270 illustrated in FIG. 11, and a longitudinal frame 274 projects outward from the upper-stage case 300 in a vehicle width direction.

Also in this configuration, during side collision of a vehicle, the longitudinal frame 274 of the middle frame 270 comes in contact with a rear side member 112 ahead of the upper-stage battery stack 54 to receive a collision load. The upper-stage battery stack 54 and the lower-stage battery stack 52 are provided to avoid the middle frame 270 in the vehicle height direction. Consequently, transmission of the collision load received by the middle frame 270 to the upper-stage battery stack 54 and the lower-stage battery stack 52 is inhibited, and the collision load is transmitted mainly to a transverse frame 272.

The present disclosure is not limited to the present embodiments described above, and includes all changes and modifications without departing from the technical scope or the essence of the present disclosure defined by the claims.

The invention claimed is:

1. A vehicle lower structure comprising:
   a battery pack stored under a floor panel,
   a lower frame that is a framework member provided on a bottom surface of the battery pack, and having fastening portions formed at both ends that project outward from the battery pack in a vehicle width direction,
   a pair of side members that are framework members, the side members being provided on both sides of the floor panel in the vehicle width direction and extending in a vehicle front-rear direction, wherein the fastening portions of the lower frame are fastened to the side members, wherein the battery pack comprises a lower-stage battery stack fixed to the lower frame and an upper-stage battery stack mounted in an upper stage of the lower-stage battery stack, the upper-stage battery stack is separated from the lower-stage battery stack in a vehicle height direction, a reinforcing member is arranged at a height position that matches a height position of a separation space between the upper-stage battery stack and the lower-stage battery stack in the vehicle height direction, and the reinforcing member comprises a pair of transverse frames extending in the vehicle width direction and provided in the vehicle front-rear direction, and a pair of longitudinal frames connected to both ends of the pair of transverse frames in the vehicle width direction and extending in the vehicle front-rear direction, and the longitudinal frames project outward from the upper-stage battery stack in the vehicle width direction.

2. The vehicle lower structure according to claim 1, wherein each longitudinal frame includes an overlap region that is aligned with the side members in terms of a position in the vehicle height direction, and an auxiliary member is provided to further project outward from the overlap region of the longitudinal frame in the vehicle width direction.

3. The vehicle lower structure according to claim 1, wherein the battery pack comprises a case tray that stores the upper-stage battery stack and the lower-stage battery stack, the upper-stage battery stack is fixed to an upper end of a plate-shaped bracket extending upward from the case tray in the vehicle front-rear direction, and a ridgeline is formed on the bracket across the vehicle front-rear direction.

4. The vehicle lower structure according to claim 2, wherein the battery pack comprises a case tray that stores the upper-stage battery stack and the lower-stage battery stack, the upper-stage battery stack is fixed to an upper end of a plate-shaped bracket extending upward from the case tray in the vehicle front-rear direction, and a ridgeline is formed on the bracket across the vehicle front-rear direction.

* * * * *